US011888674B2

(12) United States Patent
Sengupta et al.

(10) Patent No.: US 11,888,674 B2
(45) Date of Patent: Jan. 30, 2024

(54) 16-QUADRATURE AMPLITUDE MODULATION (16-QAM) DOWNLINK CONFIGURATION

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/173,683

(22) Filed: Feb. 11, 2021

(65) Prior Publication Data

US 2021/0258201 A1      Aug. 19, 2021

Related U.S. Application Data

(60) Provisional application No. 62/977,104, filed on Feb. 14, 2020.

(51) Int. Cl.
*H04L 27/34*       (2006.01)
*H04L 27/26*       (2006.01)
*H04W 72/23*       (2023.01)

(52) U.S. Cl.
CPC ......... *H04L 27/34* (2013.01); *H04L 27/2601* (2013.01); *H04W 72/23* (2023.01)

(58) Field of Classification Search
None
See application file for complete search history.

(56) References Cited

U.S. PATENT DOCUMENTS

2012/0033627 A1\* 2/2012 Li .................. H04L 5/001
                                                          370/329
2012/0113831 A1\* 5/2012 Pelletier ............... H04L 5/0053
                                                          370/252

(Continued)

FOREIGN PATENT DOCUMENTS

WO    WO-2013048108 A2 \*  4/2013  ........... H04L 5/0053
WO    WO-2019032676 A1     2/2019

OTHER PUBLICATIONS

3GPP TS 36.211: "3rd Generation Partnership Project; Technical Specification Group Radio Access Network; Evolved Universal Terrestrial Radio Access (E-UTRA); Physical Channels and Modulation (Release 16)", 3GPP Standard; Technical Specification; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V16.0.0, Jan. 14, 2020 (Jan. 14, 2020), pp. 194-246, XP051860748, 53 Pages, Retrieved from the Internet: URL: ftp://ftp.3gpp.org/Specs/archive/36_series/36.211/36211-g00.zip 36211-g00_s09-sxx.docx [retrieved on Jan. 14, 2020] sections 10.2.6. 10.2.6A.

(Continued)

*Primary Examiner* — Andrew C Oh
(74) *Attorney, Agent, or Firm* — QUALCOMM Incorporated

(57)      ABSTRACT

A method, an apparatus, and a computer program product for wireless communication are provided. The apparatus may enable selection of a modulation order ($Q_m$) parameter, a transport block size (TBS) parameter, a quantity of subframes in a transport block ($N_{SF}$) parameter, and/or the like. For example, based at least in part on receiving a downlink control information or another factor, a user equipment may select, for example, a table of $Q_m$, TBS, and $N_{SF}$ values and may select a particular set of a $Q_m$ value, a TBS value, and an $N_{SF}$ value from the table. In this way, the UE may use a (Continued)

higher order modulation and coding scheme in, for example, a narrowband Internet of Things deployment.

28 Claims, 10 Drawing Sheets

(56) References Cited

U.S. PATENT DOCUMENTS

| | | | | |
|---|---|---|---|---|
| 2013/0235756 | A1* | 9/2013 | Seo | H04B 7/0626 370/252 |
| 2015/0036590 | A1* | 2/2015 | Lahetkangas | H04L 1/0009 370/328 |
| 2015/0071099 | A1* | 3/2015 | Yi | H04L 5/1438 370/252 |
| 2015/0381310 | A1* | 12/2015 | Hammarwall | H04L 1/0026 370/329 |
| 2016/0088593 | A1* | 3/2016 | Davydov | H04L 1/00 370/329 |
| 2016/0100382 | A1 | 4/2016 | He et al. | |
| 2016/0192385 | A1* | 6/2016 | Tooher | H04W 72/0446 370/336 |
| 2017/0063435 | A1* | 3/2017 | Christensson | H04L 43/16 |
| 2017/0094621 | A1* | 3/2017 | Xu | H04W 72/23 |
| 2017/0207878 | A1* | 7/2017 | Chen | H04L 5/0096 |
| 2017/0245286 | A1* | 8/2017 | Rahmati | H04W 72/541 |
| 2018/0102890 | A1* | 4/2018 | Yi | H04L 5/0053 |
| 2018/0167946 | A1* | 6/2018 | Si | H04W 72/044 |
| 2018/0220433 | A1* | 8/2018 | Li | H04W 72/541 |
| 2018/0234206 | A1* | 8/2018 | Marinier | H04L 1/0016 |
| 2018/0234219 | A1 | 8/2018 | Sridharan et al. | |
| 2018/0317198 | A1* | 11/2018 | Lee | H04W 72/23 |
| 2019/0007182 | A1* | 1/2019 | Li | H04L 1/007 |
| 2019/0132842 | A1* | 5/2019 | Takahashi | H04B 17/336 |
| 2019/0173726 | A1* | 6/2019 | Wong | H04L 27/3405 |
| 2019/0260558 | A1* | 8/2019 | Wang | H04W 80/02 |
| 2019/0260559 | A1* | 8/2019 | Wu | H04L 1/1874 |
| 2019/0261217 | A1* | 8/2019 | Nammi | H04L 1/1812 |
| 2019/0261218 | A1* | 8/2019 | Khoshnevisan | H04L 1/0003 |
| 2019/0334655 | A1* | 10/2019 | Zhang | H04L 1/007 |
| 2020/0028611 | A1* | 1/2020 | Lee | H04J 99/00 |
| 2020/0107373 | A1* | 4/2020 | Roy | H04W 24/08 |
| 2020/0128529 | A1* | 4/2020 | Wang | H04L 5/0091 |
| 2020/0136750 | A1* | 4/2020 | Baldemair | H04L 1/1607 |
| 2020/0145165 | A1* | 5/2020 | Yang | H04L 1/0003 |
| 2020/0287654 | A1* | 9/2020 | Xi | H04L 5/0055 |
| 2021/0219329 | A1* | 7/2021 | Zhou | H04W 72/23 |

OTHER PUBLICATIONS

3GPP TS 36.213 (Dec. 2019): "3rd Generation Partnership Project; Technical Specification Group Radio Access Network; Evolved Universal Terrestrial Radio Access (E-UTRA); Physical Layer Procedures (Release 16)", 3GPP Standard; Technical Specification; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V16.0.0, Jan. 14, 2020 (Jan. 14, 2020), pp. 490-549, XP051860755, 60 Pages, Retrieved from the Internet: URL: ftp://ftp.3gpp.org/Specs/archive/36_series/36.213/36213-g00.zip 36213-g00_s14-xx.docx [retrieved on Jan. 14, 2020] sections 16.2, 16.4, 16.8.
3GPP TS 36.211: "3rd Generation Partnership Project; Technical Specification Group Radio Access Network; Evolved Universal Terrestrial Radio Access (E-UTRA); Physical Channels and Modulation (Release 16)", 3GPP Standard; Technical Specification; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V16.0.0, Jan. 14, 2020 (Jan. 14, 2020), pp. 194-246, XP051860748, Retrieved from the Internet: URL: ftp://ftp.3gpp.org/Specs/archive/36_series/36.211/36211-g00.zip 36211-g00_s09-sxx.docx [retrieved on Jan. 14, 2020] sections 10.2.6. 10.2.6A.
3GPP TS 36.213: "3rd Generation Partnership Project; Technical Specification Group Radio Access Network; Evolved Universal Terrestrial Radio Access (E-UTRA); Physical Layer Procedures (Release 16)", 3GPP Standard; Technical Specification; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V16.0.0, Jan. 14, 2020 (Jan. 14, 2020), pp. 490-549, XP051860755, Retrieved from the Internet: URL: ftp://ftp.3gpp.org/Specs/archive/36_series/36.213/36213-g00.zip 36213-g00_s14-xx.docx [retrieved on Jan. 14, 2020] sections 16.2, 16.4, 16.8.
International Search Report and Written Opinion—PCT/US2021/017925—ISA/EPO—dated May 26, 2021.
Qualcomm Incorporated, et al., "Discussion on Modulation Enhancements", 3GPP TSG RAN WG1 Meeting 91, 3GPP Draft; R1-1720390 Discussion on Modulation Enhancements, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), pp. 1-7, XP051369953, Retrieved from the Internet: URL: http://www.3gpp.org/ftp/tsg%5Fran/WG1%5FRL1/TSGR1%5F91/Docs/ [retrieved on Nov. 18, 2017] section 2, section 3.

\* cited by examiner

| MCS Index ($I_{MCS}$) | Modulation Order ($Q_m$) | TBS Index ($I_{TBS}$) |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 4 | 6 |
| 7 | 4 | 7 |

↑ Switch Point

MCS-vs-TBS table
(low overhead)

| MCS Index ($I_{MCS}$) | Modulation Order ($Q_m$) | TBS Index ($I_{TBS}$) |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 4 | 6 |
| 7 | 4 | 7 |

↑ Switch Point

MCS-vs-TBS table (high overhead)

| MCS Index ($I_{MCS}$) | Modulation Order ($Q_m$) | TBS Index ($I_{TBS}$) |
|---|---|---|
| 0 | 2 | 0 |
| 1 | 2 | 1 |
| 2 | 2 | 2 |
| 3 | 2 | 3 |
| 4 | 4 | 4 |
| 5 | 4 | 5 |
| 6 | 4 | 6 |
| 7 | 4 | 7 |

↑ Switch Point

FIG. 3D

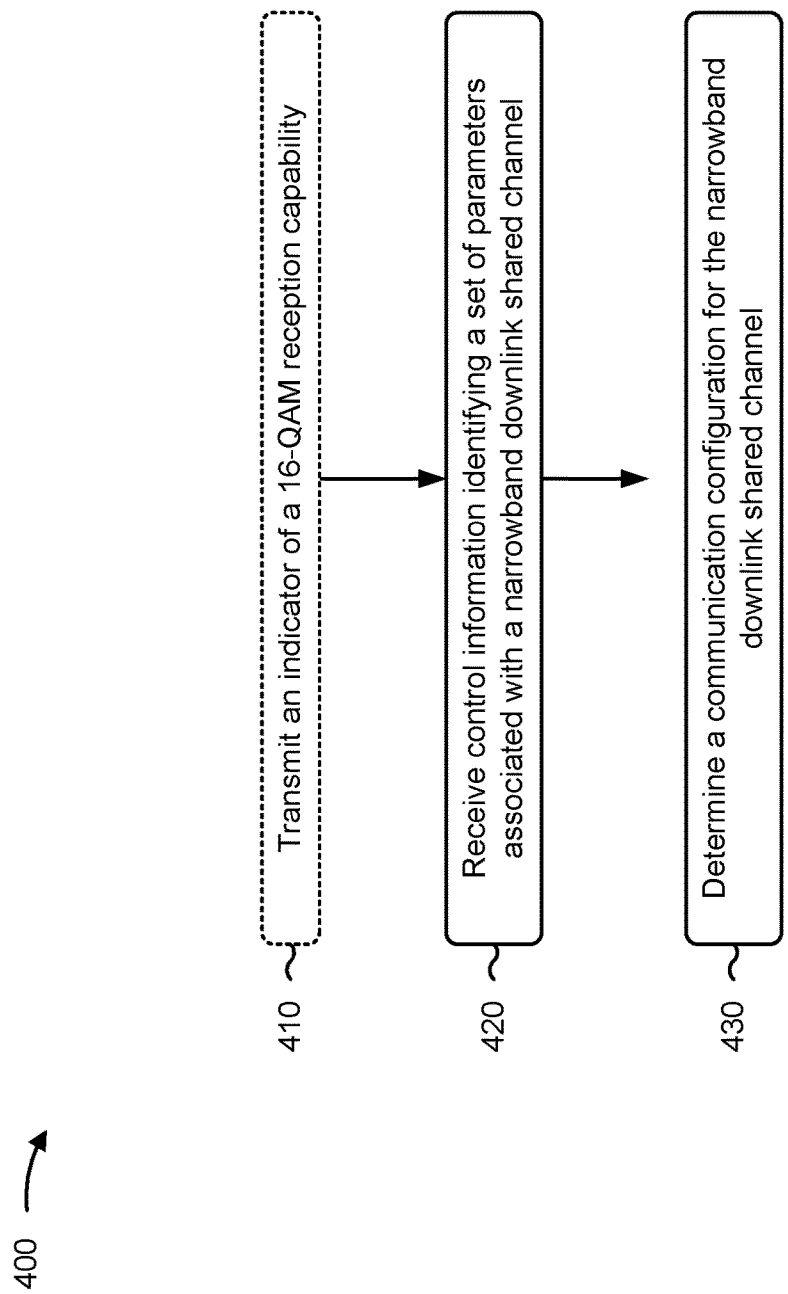

16-QUADRATURE AMPLITUDE MODULATION (16-QAM) DOWNLINK CONFIGURATION

CROSS-REFERENCE TO RELATED APPLICATION

This Patent Application claims priority to U.S. Provisional Patent Application No. 62/977,104, filed on Feb. 14, 2020, entitled "16-QUADRATURE AMPLITUDE MODULATION (16-QAM) DOWNLINK CONFIGURATION," and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for 16-quadrature amplitude modulation (16-QAM) downlink configuration.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as NR, is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some communications systems, different modulation orders may be available for user equipment (UE) and base station (BS) communications. For example, in narrowband internet of things (NB-IoT) deployments, communications systems may support modulation orders up to quadrature phase shift keying (QPSK). However, on a downlink, higher order modulation may not be supported for NB-IoT deployments. Some aspects described herein provide for configuration of higher order modulation on a downlink, such as in an NB-IoT deployment. For example, a UE may receive, from a BS, a communication via narrowband physical downlink shared channel (NPDSCH) that is modulated with at least 16-quadrature amplitude modulation (16-QAM). In this case, the communication may be a downlink control information (DCI) that includes information identifying a set of parameters for communication with the BS.

Some aspects described herein may identify an association between information that is conveyed in the NPDSCH and a configuration with which the UE is to interpret the information. Some aspects described herein may specify scheduling constraints for a higher order modulation and coding scheme. Some aspects described herein may specify joint encoding for a DCI. Some aspects described herein may enable UE selection of a modulation order ($Q_m$) parameter, a transport block size (TBS) parameter, a quantity of subframes in a transport block ($N_{SF}$) parameter, and/or the like. For example, based at least in part on receiving the DCI or another factor, as described in more detail herein, the UE may select, for example, a table of a set of $Q_m$ values, a set of TBS values, and a set of $N_{SF}$ values, and may select a particular set of a $Q_m$ value, a TBS value, and an $N_{SF}$ value from the table. In this way, the UE may use a higher order modulation and coding scheme in, for example, an NB-IoT deployment.

In some aspects, a method of wireless communication, performed by a UE, may include receiving control information identifying a set of parameters associated with a narrowband downlink shared channel modulated with at least 16-QAM; and determining, by the UE, a communication configuration for the narrowband downlink shared channel, based at least in part on the control information identifying the set of parameters associated with the narrowband downlink shared channel and based at least in part on an overhead associated with time and frequency resources available for the narrowband downlink shared channel transmission.

In some aspects, a UE for wireless communication may include a memory and one or more processors operatively coupled to the memory. The memory and the one or more processors may be configured to receive control information identifying a set of parameters associated with a narrowband downlink shared channel modulated with at least 16-QAM; and determine a communication configuration for the narrowband downlink shared channel, based at least in part on the control information identifying the set of parameters associated with the narrowband downlink shared channel and based at least in part on an overhead associated with time and frequency resources available for the narrowband downlink shared channel transmission.

In some aspects, a non-transitory computer-readable medium may store one or more instructions for wireless communication. The one or more instructions, when executed by one or more processors of a UE, may cause the one or more processors to control information identifying a set of parameters associated with a narrowband downlink shared channel modulated with at least 16-QAM; and determine a communication configuration for the narrowband downlink shared channel, based at least in part on the control information identifying the set of parameters associated with the narrowband downlink shared channel and based at least in part on an overhead associated with time and frequency resources available for the narrowband downlink shared channel transmission.

In some aspects, an apparatus for wireless communication may include means for receiving control information identifying a set of parameters associated with a narrowband downlink shared channel modulated with at least 16-QAM; and means for determining a communication configuration for the narrowband downlink shared channel, based at least in part on the control information identifying the set of parameters associated with the narrowband downlink shared channel and based at least in part on an overhead associated with time and frequency resources available for the narrowband downlink shared channel transmission.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 3A-3E are diagrams illustrating an example of 16-quadrature amplitude modulation (16-QAM) downlink configuration.

FIG. 4 is a flowchart of a method of wireless communication.

DETAILED DESCRIPTION

Figure 1:
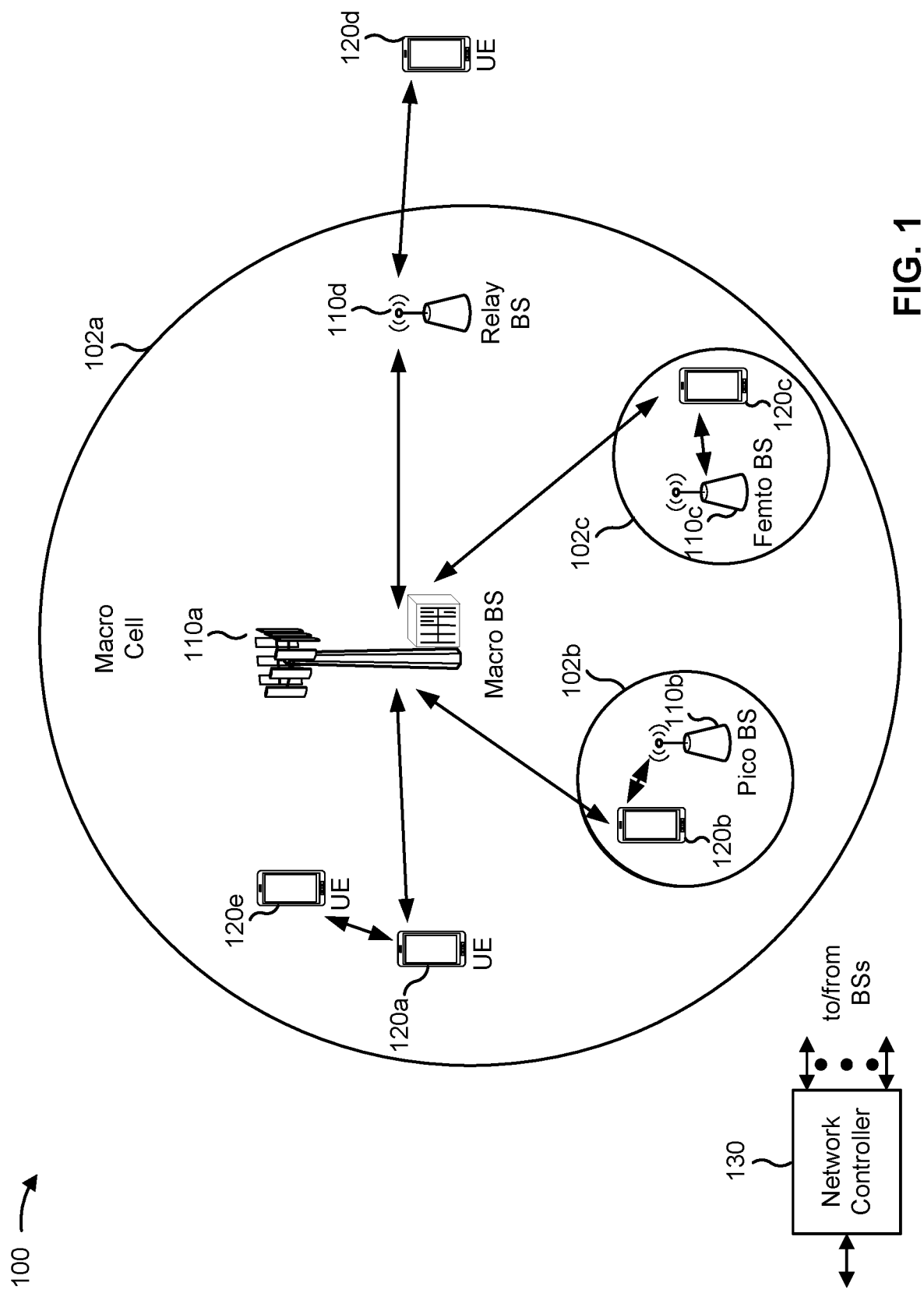
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. For example, some UEs may be NB-IoT devices that are configured for 16-quadrature amplitude modulation (16-QAM) or higher operation on a downlink. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
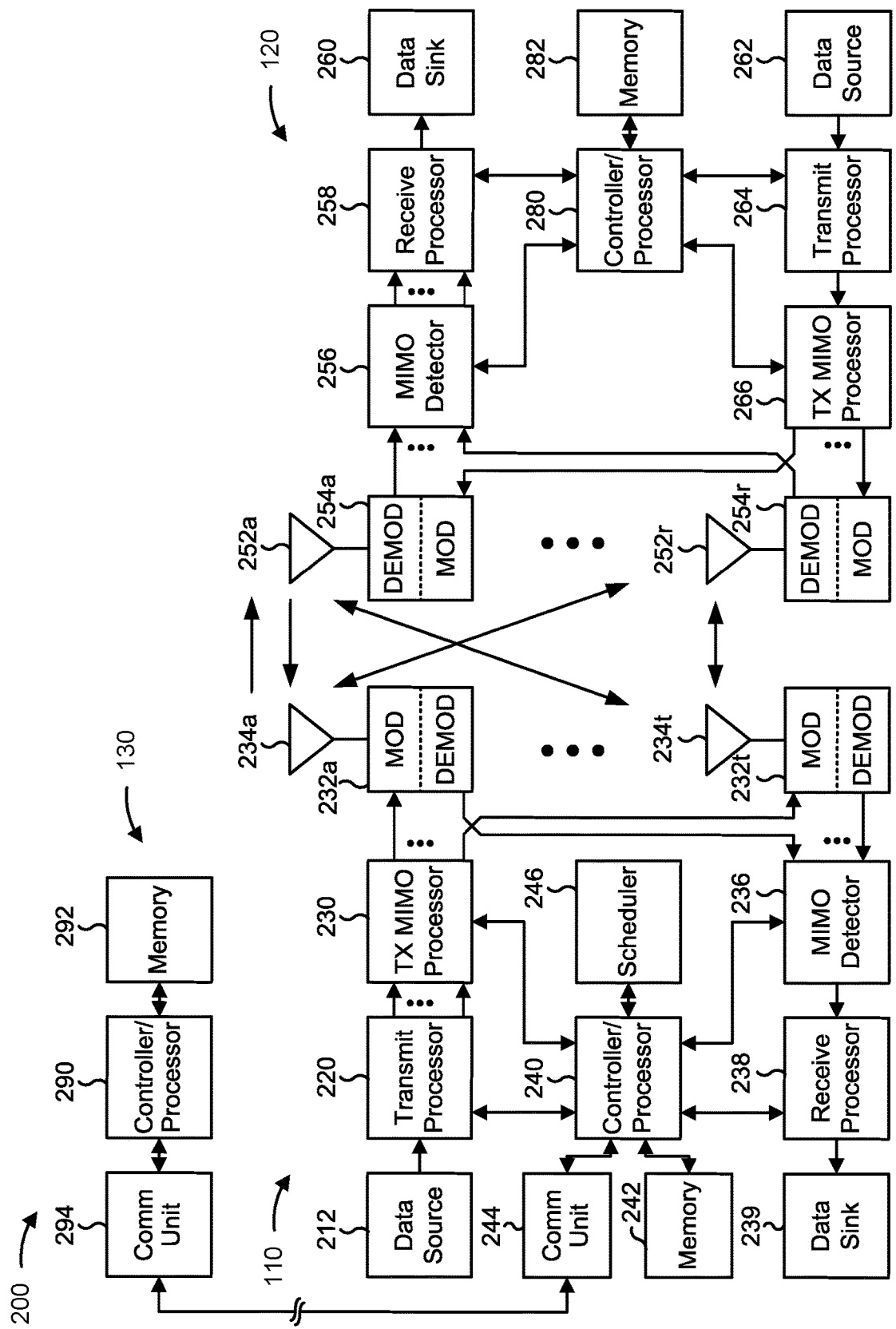
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. For example, each demodulator 254 may be configured to demodulate 16-QAM or higher modulation order transmissions from BS 110. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with 16-QAM downlink configuration, as described in more detail elsewhere herein. For example, controller/processor 240 of base station 110, controller/processor 280 of UE 120, and/or any other component(s) of FIG. 2 may perform or direct operations of, for example, method 400 of FIG. 4 and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3A:
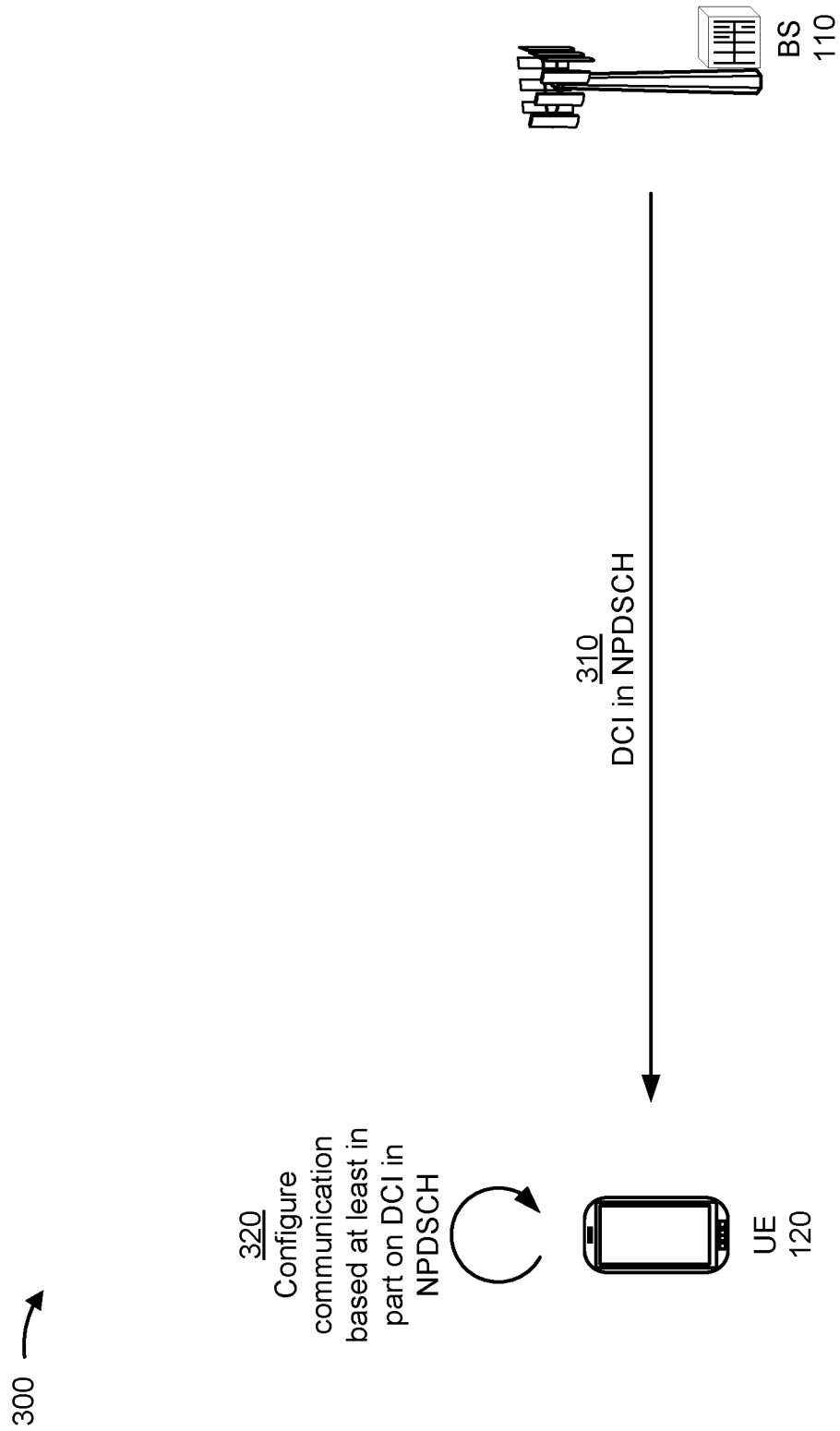

FIGS. 3A-3E are diagrams illustrating an example 300 of 16-QAM downlink configuration, in accordance with various aspects of the present disclosure. As shown in FIG. 3A, example 300 may include a BS 110 and a UE 120.

As shown in FIG. 3A, and at 310, UE 120 may receive a narrowband downlink control channel, which may include associated control information. For example, UE 120 may receive a narrowband physical downlink control channel (NPDCCH) that is associated with a narrowband physical downlink shared channel (NPDSCH), and the NPDCCH may include a DCI that schedules the NPDSCH. In one example, UE 120 may transmit, to BS 110, information identifying a UE 16-QAM reception capability to indicate that UE 120 is capable of receiving at 16-QAM or higher modulation transmission. Additionally, or alternatively, 16-QAM or higher capability may be specified for UE 120.

In some aspects, UE 120 may receive the NPDSCH with at least 16-QAM, based at least in part on a particular channel condition. For example, BS 110 may select 16-QAM transmission when a particular channel condition is present. In some aspects, BS 110 may select a particular resource allocation configuration (e.g., a particular quantity of subframes in a transport block or a particular repetition number for a subframe) for 16-QAM transmission when BS 110 selects to use 16-QAM transmission. In some aspects, 16-QAM may be selected for a subset of resource allocation configurations that can be configured with QPSK. For example, BS 110 may select 16-QAM when the repetition number is 1, but the BS 110 may select QPSK when the repetition number is 1 or other possible numbers. In some aspects, BS 110 and UE 120 may use 16-QAM based at least in part on one or more layer-1 signaling messages (e.g., DCI messages) or higher layer signaling messages (e.g., radio resource control (RRC) messages) being communicated.

In some aspects, UE 120 may receive a DCI encoded with a particular bit encoding scheme. For example, UE 120 may receive a DCI with joint encoding of DCI fields configured differently than a DCI associated with other transmission techniques that were based on QPSK. As an example, the DCI may employ joint encoding of a modulation and coding scheme parameter and a number of repetitions parameter. In this case, when a higher modulation and coding scheme index indicates 16-QAM, a quantity of bits to indicate the number of repetitions field may be only 0 bits or 1 bits (rather than 4 bits for other transmission based on QPSK as the number of repetitions may be constrained for 16-QAM to fewer values than for QPSK, as described above. Additionally, or alternatively, UE 120 may include additional bits for identifying an additional modulation and coding scheme entry associated with an additional transport block size (e.g., which may be some of the bits reduced from the number of repetitions field) for 16-QAM. Additionally, or alternatively, the DCI may include joint encoding of a resource assignment (e.g., a quantity of subframes) field with a modulation and coding scheme field or another set of jointly encoded parameters. Additionally, or alternatively, based at least in part on whether parameter tables, as described below, are RRC-configured or DCI-signaled, the DCI may be encoded using a different encoding scheme.

At 320, UE 120 may determine a communication configuration for the narrowband downlink shared channel. For example, UE 120 may determine the communication configuration based at least in part on the DCI, which schedules the NPDSCH, that identifies a set of parameters for the NPDSCH. In some aspects, the NPDSCH may have a subset of possible RNTI associations relative to, other techniques for narrowband downlink shared channel transmission (e.g., using QPSK modulation), as described below. As an example of an association that may be maintained, the NPDSCH and the scheduling DCI may be associated with a paging radio network temporary identifier (P-RNTI) and UE 120 may interpret the DCI based at least in part on the DCI being associated with a P-RNTI. For example, UE 120 may determine that the DCI is associated with a P-RNTI and may determine that the DCI is a DCI format N2 associated with a type-1 common search space (CSS). Additionally, or alternatively, UE 120 may determine that the NPDSCH and the DCI is associated with a random access response RNTI (RA-RNTI (e.g., a random access response message, such as msg2 of a random access procedure) and may determine that the DCI is a DCI format N1 associated with a type-2 CSS. Additionally, or alternatively, UE 120 may determine that the DCI is associated with a cell RNTI (C-RNTI) and may determine that the DCI is a DCI format N1 associated with a UE-specific search space (USS). Additionally, or alternatively, UE 120 may determine that the DCI is associated with a temporary C-RNTI or a C-RNTI during random access and may determine that the DCI is a DCI format N1 associated with a type-2 CSS.

In some aspects, UE 120 may determine that the DCI is associated with a system information RNTI (SI-RNTI) and may determine that the NPDSCH corresponds to a system information block (SIB). Additionally, or alternatively, UE 120 may determine that the NPDSCH is associated with single-cell point-to-multipoint (SC-PTM) control information (e.g., a single cell RNTI (SC-RNTI)) and may determine that the DCI is associated with DCI format N2 and a Type-1A CSS. Additionally, or alternatively, UE 120 may determine that the NPDSCH is associated with an SC-PTM transmission (e.g., a group RNTI (G-RNTI)) and may determine that the DCI is associated with DCI format N1 and a type-2A CSS. Additionally, or alternatively, UE 120 may determine that the NPDSCH is associated with a response to a transmission on preconfigured uplink resources (PUR) with a cell RNTI (PUR C-RNTI) and may determine that the DCI is associated with DCI format N1 and a USS.

In some aspects, UE 120 may use higher layer signaling to determine a communication configuration. For example, UE 120 may receive higher layer signaling indicating that the NPDSCH and an associated RNTI are transmitted using 16-QAM. In other words, UE 120 may receive signaling indicating that, when UE 120 receives an NPDSCH with the associated RNTI, UE 120 is to interpret the NPDSCH as having been transmitted using at least 16-QAM modulation.

In some aspects, UE 120 may determine a set of parameters (e.g., modulation order ($Q_m$), a transport block size (TBS), a quantity of subframes in a transport block ($N_{SF}$), and/or the like) for the NPDSCH when determining the communication configuration. For example, UE 120 may determine the set of parameters (e.g., select a table that includes a set of parameters or select a particular row from the table) based at least in part on one or more of a plurality of factors, as described below. As an example, UE 120 may determine the set of parameters based at least in part on a deployment type. For example, UE 120 may determine the set of parameters (e.g., a table from which UE 120 may select the set of parameters) based at least in part on whether the deployment type is an in-band deployment type, a guard-band deployment type, a standalone deployment type, and/or the like. In this case, as an example, in-band deployments may have cell-specific reference signals (CRSs) associated with a full-bandwidth cell, which may result in a different level of signaling overhead relative to another type of deployment.

For example, different NB-IoT deployments may have different reference signal overheads. "Overhead" may refer to the number or ratio of resources (e.g., resource elements) occupied by reference signals as compared to all available resources (or as compared to all resources that do not include reference signals). Because different NB-IoT deployments are associated with different resource allocations and different reference signal configurations, different NB-IoT deployments may have different reference signal overheads. For example, a standalone NB-IoT deployment may have more resource elements (REs) available as compared to an in-band NB-IoT deployment (e.g., an in-band LTE deployment) or a guard-band NB-IoT deployment type. For example, a standalone deployment type may have all resource blocks included in a dedicated NB-IoT band available for NB-IoT communications, whereas in an in-band deployment or a guard-band deployment, not all RBs within the NB-IoT band can be used for NB-IoT communications (e.g., to reduce interference with other communications).

Additionally, or alternatively, UE 120 may determine the set of parameters based at least in part on the starting time index within a subframe or slot of a first orthogonal frequency division multiplexing (OFDM) symbol of the NPDSCH in an NB-IoT downlink subframe (e.g., in an in-band deployment). In this case, UE 120 may identify a larger resource overhead for larger values of the pointer indicating the time index of the first OFDM symbol (e.g., relative to smaller values) and may select the set of parameters (e.g., a table) based at least in part on the larger resource overhead. For example, as described below, some tables of sets of parameters may be configured with values for parameters therein that are for relatively large resource overhead amounts and other tables of sets of parameters may be configured with values for parameters therein that are for relatively small resource overhead amounts. Additionally, or alternatively, UE 120 may determine the set of parameters based at least in part on a quantity of reference signal ports. For example, UE 120 may select a particular set of parameters from which to select one or more parameters when there is a particular quantity of narrowband reference signal ports, cell-specific reference signal ports, and/or the like.

Additionally, or alternatively, UE 120 may determine the set of parameters based at least in part on an energy metric. For example, UE 120 may determine an energy per resource element (EPRE) for narrowband reference signals or cell-specific reference signals in a cell in which UE 120 is receiving the NPDSCH. In this case, when UE 120 determines that, for example, the cell-specific reference signals are power boosted relative to a baseline value in a particular set of symbols, UE 120 may determine that an amount of available power for NPDSCH communication is relatively lower in the particular set of symbols, which may result in a particular selection of the set of parameters. In other words, UE 120 may select a table that is configured with parameter values appropriate for cases when a relatively lower amount of power is available for NPDSCH communication. Additionally, or alternatively, UE 120 may determine that a narrowband positioning reference signal is present in a downlink subframe, and may determine the set of parameters based at least in part on the narrowband positioning reference signal (NPRS) being present. In some aspects, when the narrowband positioning reference signal is present and collides with NPDSCH resource elements, BS 110 may puncture the NPDSCH resource elements. In this case, UE 120 may be configured to use a non-16-QAM set of parameters based at least in part on 16-QAM transmission not being supported in at least some part of the NPDSCH transmission that collides with the NPRS, or may consider the narrowband position reference signal as overhead to determine the set of parameters for enabling 16-QAM transmission. In some aspects, UE 120 may select the set of parameters based at least in part on two or more types of resource overhead, as described above.

In some aspects, UE 120 may select the set of parameters from a plurality of configured sets of parameters (e.g., each including a modulation and coding scheme parameter, a $Q_m$ parameter, a TBS parameter, an $N_{SF}$ parameter, a combination thereof, and/or the like). For example, based at least in part on a particular time index of the first OFDM symbol in a subframe or slot of an NPDSCH transmission, a particular maximum supported modulation order, and/or the like, UE 120 may select a table of configured sets of parameters, as described below. In this case, UE 120 may select the set of parameters from the selected table of configured parameters. Additionally, or alternatively, UE 120 may select the table based at least in part on a deployment scenario or another type of factor described herein. In some aspects, UE 120 may select a table based at least in part on a higher layer parameter. For example, UE 120 may be configured with a higher layer parameter configuring 16-QAM NPDSCH and may select a table for selecting a set of parameters based at least in part on the higher layer parameter. In this case, if the parameter is set to disabled, UE 120 may select a table corresponding to only QPSK-based transmission. Alternatively, if the parameter is set to enabled, UE 120 may select a table that allows for 16-QAM based NPDSCH configurations. Alternatively, UE 120 may derive a table or a pre-defined set of configurations based at least in part on the bits of the DCI.

In some aspects, UE 120 may receive a higher layer indicator explicitly identifying a configuration for the set of parameters. In this case, UE 120 may receive a higher layer parameter configuring a particular table. For example, UE 120 may receive a higher layer parameter configuring one out of a plurality of sets of parameters (e.g., one out of a plurality of sets of tables) and UE 120 determine a particular value for the parameters in the selected set of parameters (e.g., a modulation and coding scheme, transport block size, and/or the like) based at least in part on bits in the DCI identifying which parameters to select from the selected set of parameters. In other words, UE 120 may receive higher layer signaling (e.g., RRC signaling) selecting a particular table from a plurality of pre-defined tables. Further, UE 120 may select a particular row from the selected table based at least in part on a received DCI that includes information identifying an index of, for example, the particular row. In some aspects, BS 110 may account for resource overhead, as described above, when explicitly indicating which table to select using a higher layer parameter.

In some aspects, UE 120 may implicitly determine which table to select based at least in part on a DCI (e.g., rather than receiving higher layer signaling). For example, UE 120 may parse bits of the DCI to determine which table to select and may then use the DCI to select a particular row from the selected table.

FIGS. 3B-3E provide examples of tables 350-353 of sets of parameters that may be selected for decoding an NPDSCH. For example, UE 120 may have a table 350-353 configured, as described above, and may select one of tables 350-353 based at least in part on at least one of a DCI or higher layer indications, as described above. Although some aspects are described herein in terms of tables, other set descriptions or data structures that differ from what is described herein are contemplated. Moreover, although tables 350-353 are described herein, other tables may be possible and tables 350-353 may have additional values not shown.

As shown in FIG. 3B, UE 120 may use a first table 350 for mapping a modulation and coding scheme to a TBS parameter for the NPDSCH. For example, UE 120—based at least in part on the indication in the DCI—determines an entry in the table corresponding to $Q_m=4$ to select parameters for decoding a 16-QAM-based NPDSCH transmission. In this case, the entries for $Q_m=4$ may each have, for example, corresponding modulation and coding scheme (MCS) parameters, TBS parameters, and/or the like. In this case, based at least in part on selecting a particular row from table 350 (e.g., MCS Index=6, $Q_m=4$, TBS Index=6), UE 120 may use the parameter values of the particular row to decode the PDSCH.

Similarly, as shown in FIGS. 3C and 3D, UE 120 may be configured to use a table 351 for decoding a low resource overhead NPDSCH transmission or a table 352 for high resource overhead NPDSCH transmission, as described above. In this case, as shown, table 351 and table 352 may have different switch points for switching from QPSK (e.g., $Q_m=2$) to 16-QAM (e.g., $Q_m=4$) and different associated modulation and coding scheme and TBS values.

Figure 3E:
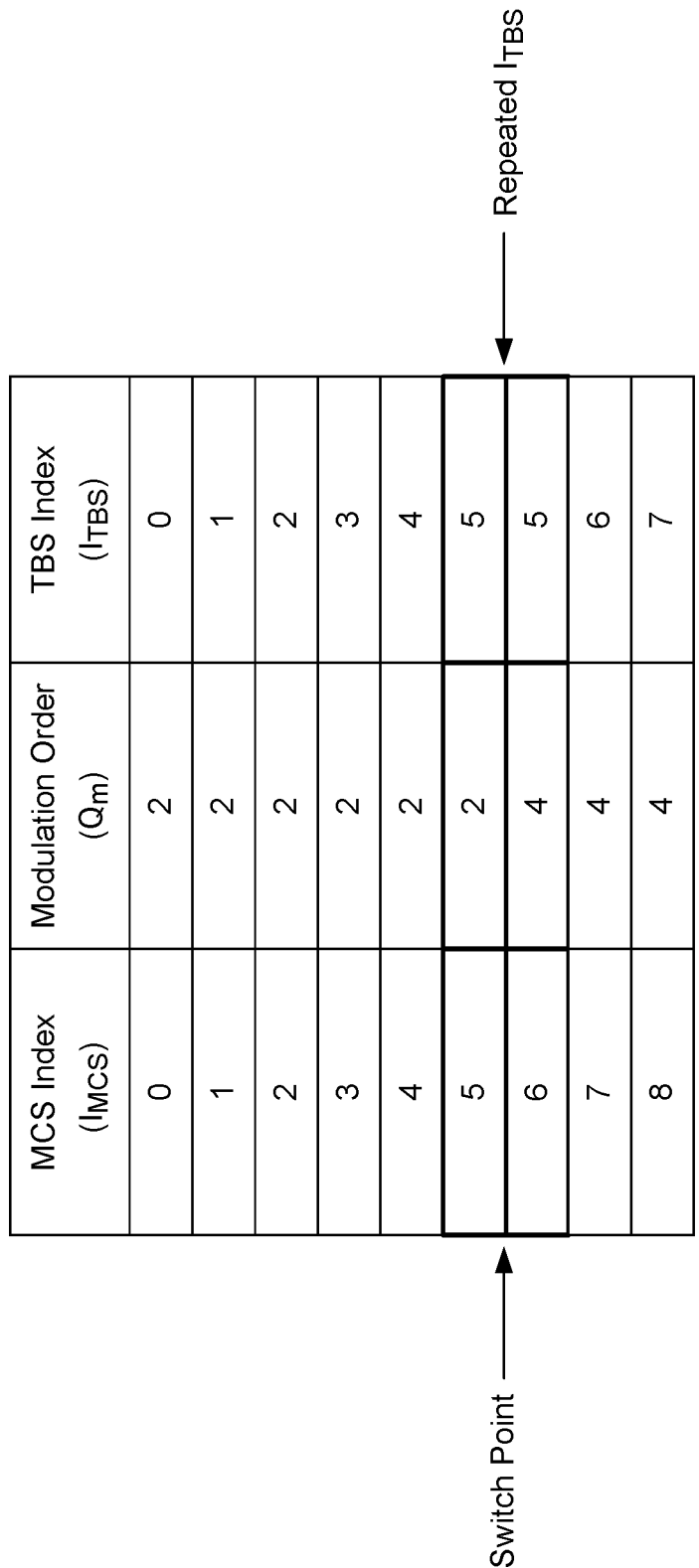

Similarly, as shown in FIG. 3E, UE 120 may be configured to use a table 353 for mapping a modulation and coding scheme to a TBS parameter for decoding the NPDSCH transmission. In this case, as shown, some TBS values map to a plurality of different modulation orders. In this way, UE 120 may be configured with a table that enables selection of parameters targeted to different resource overhead configurations for the NPDSCH transmission within a single table.

As indicated above, FIGS. 3A-3E are provided as an example. Other examples may differ from what is described with respect to FIGS. 3A-3E.

FIG. 4 is a flowchart of a method 400 of wireless communication. The method may be performed by a UE (e.g., UE 120, the apparatus 502/502' described below, and/or the like).

At 410, in some aspects, method 400 may include transmitting an indicator of a 16-QAM reception capability. For example, the UE (e.g., using receive processor 258, transmit processor 264, controller/processor 280, memory 282, and/or the like) may transmit the indicator of the 16-QAM capability, as described above. Additionally, or alternatively, the 16-QAM reception may be specified for the UE.

At 420, method 400 may include receiving control information identifying a set of parameters associated with a narrowband downlink shared channel. For example, the UE (e.g., using receive processor 258, transmit processor 264, controller/processor 280, memory 282, and/or the like) may receive, in a narrowband downlink control channel, control information identifying a set of parameters associated with a narrowband downlink shared channel modulated with at least 16-quadrature amplitude modulation (16-QAM) and corresponding to the narrowband downlink control channel, as described above. Additionally, or alternatively, the UE may receive the control information using different signaling (e.g., other than an NPDSCH or DCI), such as higher layer signaling and/or the like.

At 430, method 400 may include determining a communication configuration for the narrowband downlink shared channel. For example, the UE (e.g., using receive processor 258, transmit processor 264, controller/processor 280, memory 282, and/or the like) may determine a communication configuration for the narrowband downlink shared channel, based at least in part on the control information identifying the set of parameters associated with the narrowband downlink shared channel, as described above. Additionally, or alternatively, the method 400 may include determining the communication configuration based at least in part on an overhead associated with time and frequency resources available for the narrowband downlink shared channel transmission.

Method 400 may include additional aspects, such as any single aspect or any combination of aspects described below and/or in connection with one or more other processes described elsewhere herein.

In a first aspect, method 400 includes transmitting an indicator of a 16-QAM reception capability; and receiving the control information as a response to transmitting the indicator of the 16-QAM reception capability. In a second aspect, alone or in combination with the first aspect, the control information is a downlink control information (DCI) and the UE is configured to parse bits of the DCI based at least in part on a configuration of the control information, each configuration is determined from a subset of candidate configurations of the DCI for narrowband downlink shared channels modulated with at least quadrature phase shift keying (QPSK) modulation. In a third aspect, alone or in combination with one or more of the first and second aspects, the candidate configurations comprise an association to at least one of: a paging radio network temporary identifier (RNTI), a random access RNTI, a cell RNTI, a temporary cell RNTI, a system information RNTI, a single-cell point-to-multipoint (SC-PTM) control information RNTI, a group RNTI (G-RNTI), or a preconfigured uplink resources (PUR) cell RNTI (PUR C-RNTI).

In a fourth aspect, alone or in combination with one or more of the first through third aspects, the candidate configurations comprise an association to at least one of a DCI format or a search space type. In a fifth aspect, alone or in combination with one or more of the first through fourth aspects, determining the communication configuration comprises: determining at least one of: a modulation order, a transport block size, or a quantity of subframes in a transport block. In a sixth aspect, alone or in combination with one or more of the first through fifth aspects, determining the communication configuration comprises: determining the communication configuration based at least in part on a deployment type.

In a seventh aspect, alone or in combination with one or more of the first through sixth aspects, the deployment type includes at least one of an in-band deployment type, a guard-band deployment type, or a standalone deployment type. In an eighth aspect, alone or in combination with one or more of the first through seventh aspects, determining the communication configuration comprises: determining the communication configuration based at least in part on a starting orthogonal frequency division multiplexing (OFDM) symbol index in a subframe of the narrowband downlink shared channel. In a ninth aspect, alone or in combination with one or more of the first through eighth aspects, determining the communication configuration comprises: determining the communication configuration based at least in part on a quantity of configured reference signal ports in a cell in which the UE is communicating.

In a tenth aspect, alone or in combination with one or more of the first through ninth aspects, the quantity of configured reference signal ports include at least one of a narrowband reference signal port or a cell-specific reference signal port. In an eleventh aspect, alone or in combination with one or more of the first through tenth aspects, determining the communication configuration comprises: determining the communication configuration based at least in part on an energy metric associated with configured reference signals in a cell in which the UE is receiving the narrowband downlink shared channel. In a twelfth aspect, alone or in combination with one or more of the first through eleventh aspects, determining the communication configuration comprises: determining the communication configuration based at least in part on whether a narrowband cell and an underlying full-bandwidth cell of the narrowband cell have the same or different primary cell identifiers (PCI).

In a thirteenth aspect, alone or in combination with one or more of the first through twelfth aspects, determining the communication configuration comprises: determining the communication configuration based at least in part on a presence of a narrowband positioning reference signal. In a fourteenth aspect, alone or in combination with one or more of the first through thirteenth aspects, determining the communication configuration comprises: determining the communication configuration based at least in part on an overhead metric associated with time and frequency resources available for the narrowband downlink shared channel transmission. In a fifteenth aspect, alone or in combination with one or more of the first through fourteenth aspects, determining the communication configuration comprises: determining the communication configuration based at least in part on a group of pre-defined sets of parameters, a pre-defined set of parameters, of the group of pre-defined sets of parameters, includes at least one of a set of modulation and coding scheme parameters, a set of transport block size parameters, or a set of parameters identifying a quantity of subframes.

In a sixteenth aspect, alone or in combination with one or more of the first through fifteenth aspects, the UE is configured to select a pre-defined set of parameters, from the group of pre-defined sets of parameters, based at least in part on at least one of: a deployment type, a value of a starting orthogonal frequency division multiplexing (OFDM) symbol index in a subframe of the narrowband downlink shared channel, or a maximum modulation order. In a seventeenth aspect, alone or in combination with one or more of the first through sixteenth aspects, the UE is configured to select one or more parameters from the pre-defined set of parameters based at least in part on at least one of a deployment type, a value of a starting OFDM symbol index in a subframe of the narrowband downlink shared channel, or a maximum modulation order. In an eighteenth aspect, alone or in combination with one or more of the first through seventeenth aspects, determining the communication configuration comprises: determining the communication configuration based at least in part on receiving a higher layer parameter configuring the UE to receive a narrowband downlink shared channel.

In a nineteenth aspect, alone or in combination with one or more of the first through eighteenth aspects, the UE is configured to select quadrature phase shift keying (QPSK) modulation and an associated subset of parameters based at least in part on the higher layer parameter being disabled. In a twentieth aspect, alone or in combination with one or more of the first through nineteenth aspects, the UE is configured to select the at least 16-QAM modulation based at least in part on the higher layer parameter being enabled. In a twenty-first aspect, alone or in combination with one or more of the first through twentieth aspects, the UE is configured to select a subset of parameters for the set of parameters based at least in part on selecting the at least 16-QAM modulation.

In a twenty-second aspect, alone or in combination with one or more of the first through twenty-first aspects, determining the communication configuration comprises: determining the communication configuration based at least in part on an indication in the control information identifying a set of fields corresponding to at least one of a modulation and coding scheme, a transport block size, or a quantity of subframes. In a twenty-third aspect, alone or in combination with one or more of the first through twenty-second aspects, determining the communication configuration comprises: determining a resource allocation configuration. In a twenty-fourth aspect, alone or in combination with one or more of the first through twenty-third aspects, the resource allocation configuration is selected from a subset of available resource allocation configurations that are configurable for a narrowband downlink shared channel modulated using a modulation order of at least 2. In some aspects, the resource allocation configuration indicates that 16-QAM is to be used for a first number of repetitions and that a different modulation and coding scheme is to be used for a second number of repetitions.

In a twenty-fifth aspect, alone or in combination with one or more of the first through twenty-fourth aspects, the resource allocation configuration includes an indicator of at least one of a quantity of subframes in a transport block or a quantity of repetitions of a subframe. In a twenty-sixth aspect, alone or in combination with one or more of the first through twenty-fifth aspects, the control information comprises physical layer downlink control information (DCI), and determining the communication configuration comprises: interpreting bits of the DCI based at least in part on receiving other control information configuring the UE to receive the narrowband downlink shared channel modulated with at least 16-quadrature amplitude modulation (16-QAM). In a twenty-seventh aspect, alone or in combination with one or more of the first through twenty-sixth aspects, in the DCI, a modulation and coding scheme field and a number of repetitions field are jointly encoded. In some aspects, the resource allocation configuration indicates that 16-QAM is to be used for a first number of repetitions and that a different modulation and coding scheme is to be used for a second number of repetitions.

In a twenty-eighth aspect, alone or in combination with one or more of the first through twenty-seventh aspects, in the DCI, a modulation and coding scheme field and a resource assignment field are jointly encoded. In a twenty-ninth aspect, alone or in combination with one or more of the first through twenty-eighth aspects, the control information is a downlink control information (DCI), and determining the communication configuration comprises: determining the communication configuration based at least in part on a quantity of transport blocks scheduled by the DCI. In a thirtieth aspect, alone or in combination with one or more of the first through twenty-ninth aspects, the control information is a downlink control information (DCI), and determining the communication configuration comprises: interpreting bits of the DCI based at least in part on a quantity of transport blocks scheduled by the DCI.

In a thirty-first aspect, alone or in combination with one or more of the first through thirtieth aspects, the UE is configured to select a pre-defined set of parameters, from the group of pre-defined sets of parameters, based at least in part on an indication from a higher layer. In a thirty-second aspect, alone or in combination with one or more of the first through thirty-first aspects, the control information is a downlink control information (DCI) and wherein the UE is configured to select a pre-defined set of parameters, from the group of pre-defined sets of parameters, based at least in part on a set of bits in the DCI.

In a thirty-third aspect, alone or in combination with one or more of the first through thirty-second aspects, the overhead is determined based at least in part on at least one of a deployment type, a value of a starting orthogonal frequency division multiplexing (OFDM) symbol index in a subframe of the narrowband downlink shared channel, or a maximum modulation order. In some aspects, the deployment type includes at least one of an in-band deployment type, a guard-band deployment type, or a standalone deployment type.

In a thirty-fourth aspect, alone or in combination with one or more of the first through thirty-third aspects, the control information indicates a first modulation and coding scheme table to be used for decoding lower resource overhead narrowband downlink shared channel communications, and indicates a second modulation and coding scheme table to be used for decoding higher resource overhead narrowband downlink shared channel communications.

Although FIG. 4 shows example blocks of method 400, in some aspects, method 400 may include additional blocks, fewer blocks, different blocks, or differently arranged blocks than those depicted in FIG. 4. Additionally, or alternatively, two or more of the blocks of method 400 may be performed in parallel.

Figure 5:
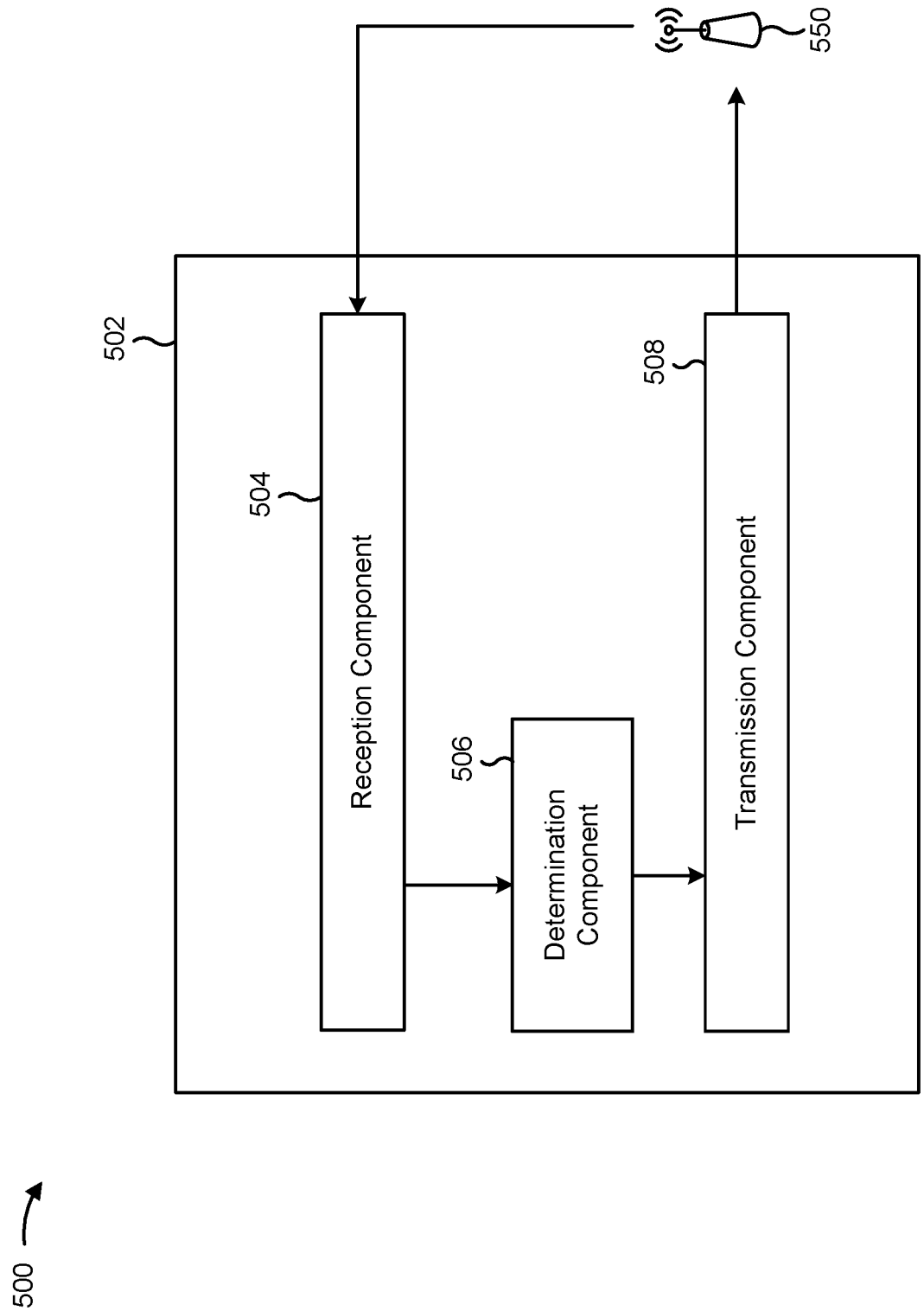
FIG. 5 is a conceptual data flow diagram illustrating a data flow between different components in an example apparatus.

FIG. 5 is a conceptual data flow diagram 500 illustrating a data flow between different components in an example apparatus 502. The apparatus 502 may be a UE (e.g., UE 120). In some aspects, the apparatus 502 includes a reception component 504, a determination component 506, and/or a transmission component 508.

The reception component 504 may receive data on a downlink from BS 550, such as a DCI including information relating to 16-QAM or higher communication. The determination component 506 may determine a communication configuration based at least in part on received signaling from BS 550, as described above. For example, the determination component 506 may parse a received NPDCCH to identify a table from which to select a modulation and coding scheme, transport block size, quantity of subframes in a transport block, and/or the like for receiving an NPDSCH, as described above. In some aspects, the transmission component 508 may transmit UE capability information indicating that the apparatus 502 is capable of using 16-QAM or higher modulation.

The apparatus may include additional components that perform each of the blocks of the algorithm in the aforementioned method 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6:
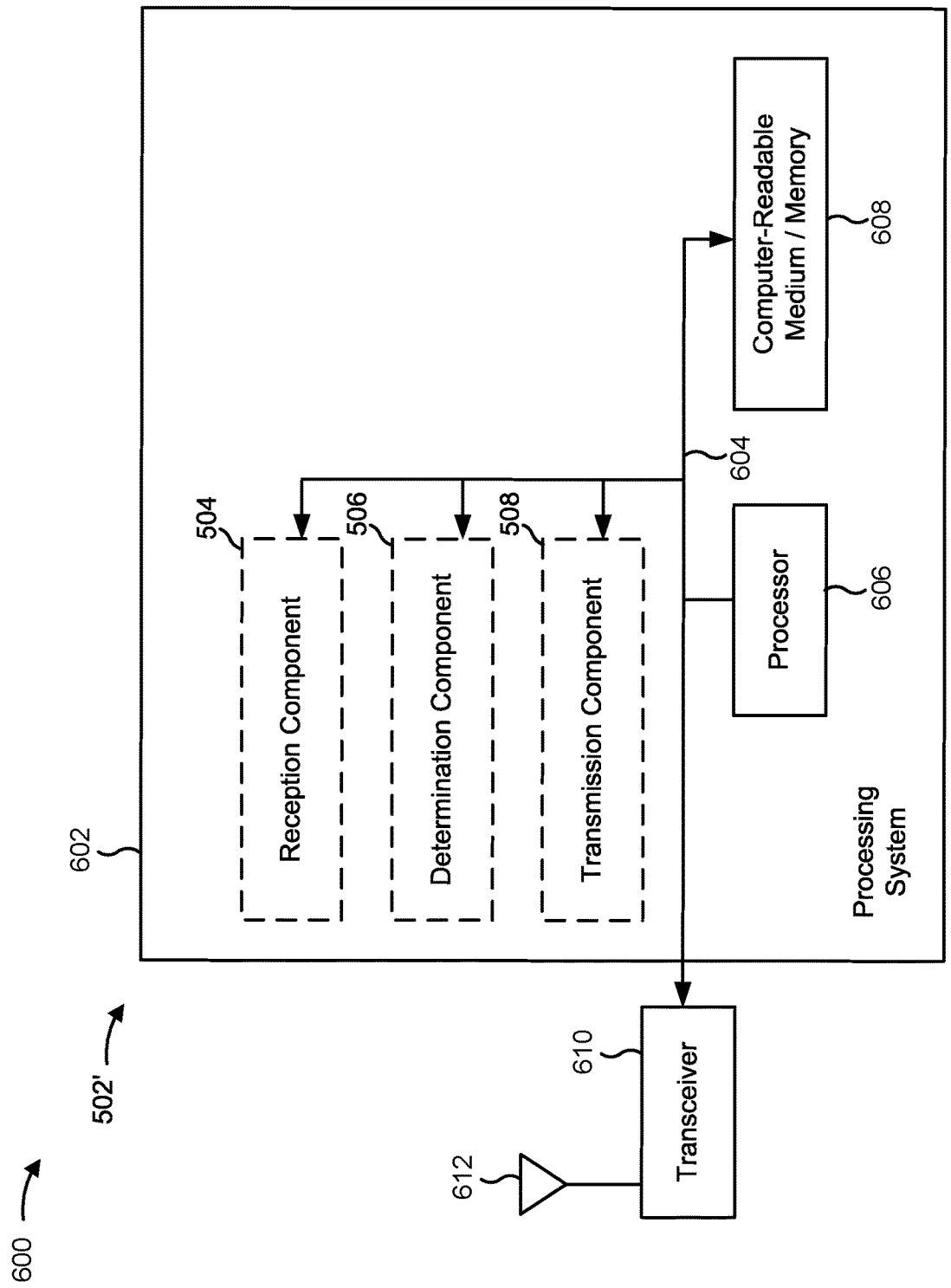
FIG. 6 is a diagram illustrating an example of a hardware implementation for an apparatus employing a processing system.

FIG. 6 is a diagram 600 illustrating an example of a hardware implementation for an apparatus 502' employing a processing system 602. The apparatus 502' may be a UE (e.g., UE 120).

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware components, represented by the processor 606, the components 504, 506, and/or 508, and the computer-readable medium/memory 608. The bus 604 may also link various other circuits such as timing sources, peripherals, voltage regulators, and power management circuits, which are well known in the art, and therefore will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602, specifically the reception component 504. In addition, the transceiver 610 receives information from the processing system 602, specifically the transmission component 508, and based at least in part on the received information, generates a signal to be applied to the one or more antennas 612. The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described herein for any particular apparatus. The computer-readable medium/memory 608 may also be used for storing data that is manipulated by the processor 606 when executing software. The processing system further includes at least one of the components 504, 506, and/or 508. The components may be software modules running in the processor 606, resident/stored in the computer-readable medium/memory 608, one or more hardware modules coupled to the processor 606, or some combination thereof. The processing system 602 may be a component of the UE 120 and may include the memory 282 and/or at least one of the TX MIMO processor 266, the RX processor 258, and/or the controller/processor 280.

In some aspects, the apparatus 502/502' for wireless communication includes means for receiving control information identifying a set of parameters associated with a narrowband downlink shared channel modulated with at least 16-QAM; means for determining a communication configuration for the narrowband downlink shared channel, based at least in part on the control information identifying the set of parameters associated with the narrowband downlink shared channel; and/or the like. In some aspects, the means for determining the communication configuration includes means for determining the communication configuration based at least in part on an overhead associated with time and frequency resources available for the narrowband downlink shared channel transmission. The aforementioned means may be one or more of the aforementioned components of the apparatus 502 and/or the processing system 602 of the apparatus 502' configured to perform the functions recited by the aforementioned means. As described elsewhere herein, the processing system 602 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 6 is provided as an example. Other examples may differ from what is described in connection with FIG. 6.

The following provides an overview of some Aspects of the present disclosure:

Aspect 1: A method of wireless communication, comprising: receiving, by a user equipment (UE), control information identifying a set of parameters associated with a narrowband downlink shared channel modulated with at least 16-quadrature amplitude modulation (16-QAM); and determining, by the UE, a communication configuration for the narrowband downlink shared channel, based at least in part on the control information identifying the set of parameters associated with the narrowband downlink shared channel.

Aspect 2: The method of Aspect 1, further comprising: transmitting an indicator of a 16-QAM reception capability;

and wherein receiving the control information comprises: receiving the control information as a response to transmitting the indicator of the 16-QAM reception capability. wherein receiving the control information comprises: receiving the control information as a response to transmitting the indicator of the 16-QAM reception capability.

Aspect 3: The method of any of Aspects 1-2, wherein the control information is a downlink control information (DCI) and the UE is configured to parse bits of the DCI based at least in part on a configuration of the control information, wherein each configuration is determined from a subset of candidate configurations of the DCI for narrowband downlink shared channels modulated with at least quadrature phase shift keying (QPSK) modulation.

Aspect 4: The method of Aspect 3, wherein the candidate configurations comprise an association to at least one of: a paging radio network temporary identifier (RNTI), a random access RNTI, a cell RNTI, a temporary cell RNTI, a system information RNTI, a single-cell point-to-multipoint (SC-PTM) control information RNTI, a group RNTI (G-RNTI), or a preconfigured uplink resources (PUR) cell RNTI (PUR C-RNTI).

Aspect 5: The method of Aspect 3, wherein the candidate configurations comprise an association to at least one of a DCI format or a search space type.

Aspect 6: The method of any of Aspects 1-5, wherein determining the communication configuration comprises: determining at least one of: a modulation order, a transport block size, or a quantity of subframes in a transport block.

Aspect 7: The method of any of Aspects 1-6, wherein determining the communication configuration comprises: determining the communication configuration based at least in part on a deployment type.

Aspect 8: The method of Aspect 7, wherein the deployment type includes at least one of an in-band deployment type, a guard-band deployment type, or a standalone deployment type.

Aspect 9: The method of any of Aspects 1-8, wherein determining the communication configuration comprises: determining the communication configuration based at least in part on a starting orthogonal frequency division multiplexing (OFDM) symbol index in a subframe of the narrowband downlink shared channel.

Aspect 10: The method of any of Aspects 1-9, wherein determining the communication configuration comprises: determining the communication configuration based at least in part on a quantity of configured reference signal ports in a cell in which the UE is communicating.

Aspect 11: The method of Aspect 10, wherein the quantity of configured reference signal ports include at least one of a narrowband reference signal port or a cell-specific reference signal port.

Aspect 12: The method of any of Aspects 1-11, wherein determining the communication configuration comprises: determining the communication configuration based at least in part on an energy metric associated with configured reference signals in a cell in which the UE is receiving the narrowband downlink shared channel.

Aspect 13: The method of any of Aspects 1-12, wherein determining the communication configuration comprises: determining the communication configuration based at least in part on whether a narrowband cell and an underlying full-bandwidth cell of the narrowband cell have the same or different primary cell identifiers (PCI).

Aspect 14: The method of any of Aspects 1-13, wherein determining the communication configuration comprises: determining the communication configuration based at least in part on a presence of a narrowband positioning reference signal.

Aspect 15: The method of any of Aspects 1-14, wherein determining the communication configuration comprises: determining the communication configuration based at least in part on an overhead metric associated with time and frequency resources available for the narrowband downlink shared channel transmission.

Aspect 16: The method of any of Aspects 1-15, wherein determining the communication configuration comprises: determining the communication configuration based at least in part on a group of pre-defined sets of parameters, wherein a pre-defined set of parameters, of the group of pre-defined sets of parameters, includes at least one of a set of modulation and coding scheme parameters, a set of transport block size parameters, or a set of parameters identifying a quantity of subframes.

Aspect 17: The method of any of Aspects 1-16, wherein the UE is configured to select a pre-defined set of parameters, from the group of pre-defined sets of parameters, based at least in part on at least one of: a deployment type, a value of a starting orthogonal frequency division multiplexing (OFDM) symbol index in a subframe of the narrowband downlink shared channel, or a maximum modulation order.

Aspect 18: The method of Aspect 17, wherein the UE is configured to select one or more parameters from the pre-defined set of parameters based at least in part on at least one of a deployment type, a value of a starting OFDM symbol index in a subframe of the narrowband downlink shared channel, or a maximum modulation order.

Aspect 19: The method of Aspect 16, wherein the UE is configured to select a pre-defined set of parameters, from the group of pre-defined sets of parameters, based at least in part on an indication from a higher layer.

Aspect 20: The method of Aspect 16, wherein the control information is a downlink control information (DCI) and wherein the UE is configured to select a pre-defined set of parameters, from the group of pre-defined sets of parameters, based at least in part on a set of bits in the DCI.

Aspect 21: The method of any of Aspects 1-20, wherein determining the communication configuration comprises: determining the communication configuration based at least in part on receiving a higher layer parameter configuring the UE to receive a narrowband downlink shared channel.

Aspect 22: The method of Aspect 21, wherein the UE is configured to select quadrature phase shift keying (QPSK) modulation and an associated subset of parameters based at least in part on the higher layer parameter being disabled.

Aspect 23: The method of Aspect 21, wherein the UE is configured to select the at least 16-QAM modulation based at least in part on the higher layer parameter being enabled.

Aspect 24: The method of Aspect 23, wherein the UE is configured to select a subset of parameters for the set of parameters based at least in part on selecting the at least 16-QAM modulation.

Aspect 25: The method of any of Aspects 1-24, wherein determining the communication configuration comprises: determining the communication configuration based at least in part on an indication in the control information identifying a set of fields corresponding to at least one of a modulation and coding scheme, a transport block size, or a quantity of subframes.

Aspect 26: The method of any of Aspects 1-25, wherein determining the communication configuration comprises: determining a resource allocation configuration.

Aspect 27: The method of Aspect 26, wherein the resource allocation configuration is selected from a subset of available resource allocation configurations that are configurable for a narrowband downlink shared channel modulated using a modulation order of at least 2.

Aspect 28: The method of Aspect 26, wherein the resource allocation configuration includes an indicator of at least one of a quantity of subframes in a transport block or a quantity of repetitions of a subframe.

Aspect 29: The method of any of Aspects 1-28, wherein the control information comprises physical layer downlink control information (DCI), and determining the communication configuration comprises: interpreting bits of the DCI based at least in part on receiving other control information configuring the UE to receive the narrowband downlink shared channel modulated with at least 16-quadrature amplitude modulation (16-QAM).

Aspect 30: The method of Aspect 29, wherein in the DCI, a modulation and coding scheme field and a number of repetitions field are jointly encoded.

Aspect 31: The method of Aspect 29, wherein in the DCI, a modulation and coding scheme field and a resource assignment field are jointly encoded.

Aspect 32: The method of any of Aspects 1-31, wherein the control information is a downlink control information (DCI), and wherein determining the communication configuration comprises: determining the communication configuration based at least in part on a quantity of transport blocks scheduled by the DCI.

Aspect 33: The method of any of Aspects 1-32, wherein the control information is a downlink control information (DCI), and wherein determining the communication configuration comprises: interpreting bits of the DCI based at least in part on a quantity of transport blocks scheduled by the DCI.

Aspect 34: An apparatus for wireless communication at a device, comprising a processor; memory coupled with the processor; and instructions stored in the memory and executable by the processor to cause the apparatus to perform the method of one or more Aspects of Aspects 1-33.

Aspect 35: A device for wireless communication, comprising a memory and one or more processors coupled to the memory, the memory and the one or more processors configured to perform the method of one or more Aspects of Aspects 1-33.

Aspect 36: An apparatus for wireless communication, comprising at least one means for performing the method of one or more Aspects of Aspects 1-33.

Aspect 37: A non-transitory computer-readable medium storing code for wireless communication, the code comprising instructions executable by a processor to perform the method of one or more Aspects of Aspects 1-33.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 1-33.

Aspect 39: A method of wireless communication, comprising: receiving, by a user equipment (UE), control information identifying a set of parameters associated with a narrowband downlink shared channel modulated with at least 16-quadrature amplitude modulation (16-QAM); and determining, by the UE, a communication configuration for the narrowband downlink shared channel based at least in part on the control information identifying the set of parameters associated with the narrowband downlink shared channel and based at least in part on an overhead associated with time and frequency resources available for the narrowband downlink shared channel transmission.

Aspect 40: The method of Aspect 39, wherein the overhead is determined based at least in part on at least one of a deployment type, a value of a starting orthogonal frequency division multiplexing (OFDM) symbol index in a subframe of the narrowband downlink shared channel, or a maximum modulation order.

Aspect 41: The method of Aspect 40, wherein the deployment type includes at least one of an in-band deployment type, a guard-band deployment type, or a standalone deployment type.

Aspect 42: The method of any of Aspects 39-41, wherein the control information indicates a first modulation and coding scheme table to be used for decoding lower resource overhead narrowband downlink shared channel communications, and indicates a second modulation and coding scheme table to be used for decoding higher resource overhead narrowband downlink shared channel communications.

Aspect 43: The method of any of Aspects 39-42, wherein determining the communication configuration comprises determining a resource allocation configuration.

Aspect 44: The method of Aspect 43, wherein the resource allocation configuration is selected from a subset of available resource allocation configurations that are configurable for a narrowband downlink shared channel modulated using a modulation order of at least 2.

Aspect 45: The method of any of Aspects 43-44, wherein the resource allocation configuration includes an indicator of at least one of a quantity of subframes in a transport block or a quantity of repetitions of a subframe.

Aspect 46: The method of any of Aspects 43-45, wherein the resource allocation configuration indicates that 16-QAM is to be used for a first number of repetitions and that a different modulation and coding scheme is to be used for a second number of repetitions.

Aspect 47: The method of any of Aspects 39-46, wherein determining the communication configuration comprises determining the communication configuration based at least in part on a group of pre-defined sets of parameters, wherein a pre-defined set of parameters, of the group of pre-defined sets of parameters, includes at least one of a set of modulation and coding scheme parameters, a set of transport block size parameters, or a set of parameters identifying a quantity of subframes.

Aspect 48: The method of Aspect 47, wherein the UE is configured to select a pre-defined set of parameters, from the group of pre-defined sets of parameters, based at least in part on at least one of: a deployment type, a value of a starting orthogonal frequency division multiplexing (OFDM) symbol index in a subframe of the narrowband downlink shared channel, or a maximum modulation order.

Aspect 49: The method of any of Aspects 47-48, wherein the UE is configured to select one or more parameters from the pre-defined set of parameters based at least in part on at least one of a deployment type, a value of a starting OFDM symbol index in a subframe of the narrowband downlink shared channel, or a maximum modulation order.

Aspect 50: The method of any of Aspects 47-49, wherein the UE is configured to select a pre-defined set of parameters, from the group of pre-defined sets of parameters, based at least in part on an indication from a higher layer.

Aspect 51: The method of any of Aspects 47-50, wherein the control information is a downlink control information (DCI) and wherein the UE is configured to select a pre-defined set of parameters, from the group of pre-defined sets of parameters, based at least in part on a set of bits in the DCI.

Aspect 52: The method of any of Aspects 39-51, wherein determining the communication configuration comprises determining at least one of: a modulation order, a transport block size, or a quantity of subframes in a transport block.

Aspect 53: The method of any of Aspects 39-52, further comprising: transmitting an indicator of a 16-QAM reception capability; and wherein receiving the control information comprises: receiving the control information as a response to transmitting the indicator of the 16-QAM reception capability. wherein receiving the control information comprises: receiving the control information as a response to transmitting the indicator of the 16-QAM reception capability.

Aspect 54: The method of any of Aspects 39-53, wherein the control information is a downlink control information (DCI) and the UE is configured to parse bits of the DCI based at least in part on a configuration of the control information, wherein each configuration is determined from a subset of candidate configurations of the DCI for narrowband downlink shared channels modulated with at least quadrature phase shift keying (QPSK) modulation.

Aspect 55: The method of Aspect 54, wherein the candidate configurations comprise an association to at least one of: a paging radio network temporary identifier (RNTI), a random access RNTI, a cell RNTI, a temporary cell RNTI, a system information RNTI, a single-cell point-to-multipoint (SC-PTM) control information RNTI, a group RNTI (G-RNTI), or a preconfigured uplink resources (PUR) cell RNTI (PUR C-RNTI).

Aspect 56: The method of any of Aspects 54-55, wherein the candidate configurations comprise an association to at least one of a DCI format or a search space type.

Aspect 57: The method of any of Aspects 39-56, wherein determining the communication configuration comprises determining the communication configuration based at least in part on at least one of: a starting orthogonal frequency division multiplexing (OFDM) symbol index in a subframe of the narrowband downlink shared channel; a quantity of configured reference signal ports in a cell in which the UE is communicating; an energy metric associated with configured reference signals in a cell in which the UE is receiving the narrowband downlink shared channel; whether a narrowband cell and an underlying full-bandwidth cell of the narrowband cell have the same or different primary cell identifiers (PCI); a presence of a narrowband positioning reference signal; receiving a higher layer parameter configuring the UE to receive a narrowband downlink shared channel; or an indication in the control information identifying a set of fields corresponding to at least one of a modulation and coding scheme, a transport block size, or a quantity of subframes.

Aspect 58: The method of Aspect 57, wherein the quantity of configured reference signal ports include at least one of a narrowband reference signal port or a cell-specific reference signal port.

Aspect 59: The method of any of Aspects 57-58, wherein the UE is configured to select quadrature phase shift keying (QPSK) modulation and an associated subset of parameters based at least in part on the higher layer parameter being disabled, or wherein the UE is configured to select the at least 16-QAM modulation based at least in part on the higher layer parameter being enabled.

Aspect 60: The method of any of Aspects 39-59, wherein the control information comprises physical layer downlink control information (DCI), and determining the communication configuration comprises: interpreting bits of the DCI based at least in part on receiving other control information configuring the UE to receive the narrowband downlink shared channel modulated with at least 16-quadrature amplitude modulation (16-QAM), wherein at least two fields in the DCI are jointly encoded.

Aspect 61: The method of any of Aspects 39-60, wherein the control information is a downlink control information (DCI), and wherein determining the communication configuration comprises: determining the communication configuration based at least in part on a quantity of transport blocks scheduled by the DCI, or interpreting bits of the DCI based at least in part on a quantity of transport blocks scheduled by the DCI.

Aspect 62: An apparatus for wireless communication at a device, comprising a processor; memory coupled with the processor; and instructions stored in the memory and executable by the processor to cause the apparatus to perform the method of one or more Aspects of Aspects 39-60.

Aspect 63: A device for wireless communication, comprising a memory and one or more processors coupled to the memory, the memory and the one or more processors configured to perform the method of one or more Aspects of Aspects 39-60.

Aspect 64: An apparatus for wireless communication, comprising at least one means for performing the method of one or more Aspects of Aspects 39-60.

Aspect 65: A non-transitory computer-readable medium storing code for wireless communication, the code comprising instructions executable by a processor to perform the method of one or more Aspects of Aspects 39-60.

Aspect 66: A non-transitory computer-readable medium storing a set of instructions for wireless communication, the set of instructions comprising one or more instructions that, when executed by one or more processors of a device, cause the device to perform the method of one or more Aspects of Aspects 39-60.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a user equipment (UE), control information identifying a set of parameters associated with a first narrowband downlink shared channel modulated with at least 16-quadrature amplitude modulation (16-QAM); and
   determining, by the UE, a resource allocation configuration for the first narrowband downlink shared channel based at least in part on the control information and based at least in part on an overhead associated with resources available for a 16 QAM transmission on the first narrowband downlink shared channel,
   wherein the resource allocation configuration indicates:
      a quantity of one or more subframes for the first narrowband downlink shared channel, and
      a quantity of repetitions, of a subframe of the one or more subframes, for the 16-QAM transmission, and
   wherein the overhead is based at least in part on a value of a starting orthogonal frequency division multiplexing (OFDM) symbol index in the subframe.

2. The method of claim 1, wherein the overhead is further based at least in part on at least one of a deployment type or a maximum modulation order.

3. The method of claim 2, wherein the deployment type includes at least one of an in-band deployment type, a guard-band deployment type, or a standalone deployment type.

4. The method of claim 1, wherein the control information indicates a first modulation and coding scheme table to be used for decoding lower resource overhead narrowband downlink shared channel communications, and indicates a second modulation and coding scheme table to be used for decoding higher resource overhead narrowband downlink shared channel communications.

5. The method of claim 1, wherein determining the resource allocation configuration comprises:
   selecting the resource allocation configuration from a subset of available resource allocation configurations including the resource allocation configuration and a second resource allocation configuration, and wherein the second resource allocation configuration is configurable for a second narrowband downlink shared channel modulated using a modulation order of at least 2.

6. The method of claim 1, wherein the resource allocation configuration indicates that a second modulation and coding scheme is to be used for a second number of repetitions.

7. The method of claim 1, wherein determining the resource allocation configuration is further based at least in part on a group of pre-defined sets of parameters,
   wherein a pre-defined set of parameters, of the group of pre-defined sets of parameters, includes at least one of a set of modulation and coding scheme parameters, a set of transport block size parameters, or a set of parameters identifying the quantity of the one or more subframes.

8. The method of claim 7, further comprising:
   selecting the pre-defined set of parameters, from the group of pre-defined sets of parameters, based at least in part on at least one of: a deployment type, the value of the starting OFDM symbol index in the subframe, or a maximum modulation order.

9. The method of claim 7, further comprising:
   selecting one or more parameters from the pre-defined set of parameters based at least in part on at least one of a deployment type, the value of the starting OFDM symbol index in the subframe, or a maximum modulation order.

10. The method of claim 7, further comprising:
    selecting the pre-defined set of parameters, from the group of pre-defined sets of parameters, based at least in part on an indication from a higher layer.

11. The method of claim 7, wherein the control information is a downlink control information (DCI), and the method further comprising:
    selecting the pre-defined set of parameters, from the group of pre-defined sets of parameters, based at least in part on a set of bits in the DCI.

12. The method of claim 1, wherein determining the resource allocation configuration is further based at least in part on at least one of:
    a modulation order,
    a transport block size, or
    a quantity of subframes in a transport block.

13. The method of claim 1, further comprising:
    transmitting an indicator of a 16-QAM reception capability; and
    wherein receiving the control information is based at least in part on response to transmitting the indicator of the 16-QAM reception capability.

14. The method of claim 1, wherein the control information is a downlink control information (DCI), and the method further comprising:
    parsing bits of the DCI based at least in part on a control information configuration of the DCI,
    wherein the control information configuration is from a subset of control information candidate configurations of the DCI for narrowband downlink shared channels including the first narrowband downlink shared channel and a second narrowband downlink shared channel,
    wherein the second narrowband downlink shared channel is modulated with at least quadrature phase shift keying (QPSK) modulation.

15. The method of claim 14, wherein the subset of control information candidate configurations comprises an association to at least one of:
    a paging radio network temporary identifier (RNTI),
    a random access RNTI,
    a cell RNTI,
    a temporary cell RNTI,
    a system information RNTI,
    a single-cell point-to-multipoint (SC-PTM) control information RNTI,
    a group RNTI (G-RNTI), or
    a preconfigured uplink resources (PUR) cell RNTI (PUR C-RNTI).

16. The method of claim 14, wherein the subset of control information candidate configurations comprises an association to at least one of a DCI format or a search space type.

17. The method of claim 1, wherein determining the resource allocation configuration is further based at least in part on at least one of:
receiving a higher layer parameter configuring the UE to receive the 16-QAM transmission; or
an indication in the control information identifying a set of fields corresponding to the quantity of the one or more subframes and the quantity of repetitions.

18. The method of claim 1, further comprising:
receiving a higher layer parameter configuring the UE to receive the 16-QAM transmission,
wherein determining the resource allocation configuration comprises:
selecting a QAM modulation based at least in part on the higher layer parameter being enabled.

19. The method of claim 1, wherein the control information comprises physical layer downlink control information (DCI), and determining the resource allocation configuration comprises:
interpreting bits of the DCI based at least in part on receiving other control information configuring the UE to receive the 16-QAM transmission, wherein at least two fields in the DCI are jointly encoded.

20. The method of claim 1, wherein the control information is a downlink control information (DCI), and wherein determining the resource allocation configuration comprises:
determining the resource allocation configuration based at least in part on a quantity of transport blocks scheduled by the DCI, or
interpreting bits of the DCI based at least in part on the quantity of transport blocks scheduled by the DCI.

21. A user equipment (UE) for wireless communication, comprising:
a memory; and
one or more processors coupled to the memory, the one or more processors configured to:
receive control information identifying a set of parameters associated with a first narrowband downlink shared channel modulated with at least 16-quadrature amplitude modulation (16-QAM); and
determine a resource allocation configuration for the first narrowband downlink shared channel based at least in part on the control information and based at least in part on an overhead associated with resources available for a 16-QAM transmission on the first narrowband downlink shared channel,
wherein the resource allocation configuration indicates:
a quantity of one or more subframes in the first narrowband downlink shared channel, and
a quantity of repetitions, of a subframe of the one or more subframes, for the 16-QAM transmission, and
wherein the overhead is based at least in part on a value of a starting orthogonal frequency division multiplexing (OFDM) symbol index in the subframe.

22. The UE of claim 21, wherein the overhead is based at least in part on at least one of a deployment type or a maximum modulation order.

23. The UE of claim 22, wherein the deployment type includes at least one of an in-band deployment type, a guard-band deployment type, or a standalone deployment type.

24. The UE of claim 21, wherein the resource allocation configuration indicates that a second modulation and coding scheme is to be used for a second number of repetitions.

25. The UE of claim 21, wherein the one or more processors, to determine the resource allocation configuration, are configured to:
determine the resource allocation configuration based at least in part on a group of pre-defined sets of parameters,
wherein a pre-defined set of parameters, of the group of pre-defined sets of parameters, includes at least one of a set of modulation and coding scheme parameters, a set of transport block size parameters, or a set of parameters identifying the quantity of the one or more subframes.

26. The UE of claim 25, wherein the one or more processors are further configured to:
select the pre-defined set of parameters, from the group of pre-defined sets of parameters, based at least in part on at least one of a deployment type, the value of the starting OFDM symbol index in the subframe, or a maximum modulation order.

27. A non-transitory computer-readable medium storing a set of instructions for wireless communication, the set of instructions comprising:
one or more instructions that, when executed by one or more processors of a user equipment (UE), cause the UE to:
receive control information identifying a set of parameters associated with a first narrowband downlink shared channel modulated with at least 16-quadrature amplitude modulation (16-QAM); and
determine a resource allocation configuration for the first narrowband downlink shared channel based at least in part on the control information and based at least in part on an overhead associated with resources available for a 16-QAM transmission on the first narrowband downlink shared channel,
wherein the resource allocation configuration indicates:
a quantity of one or more subframes in the first narrowband downlink shared channel, and
a quantity of repetitions, of a subframe of the one or more subframes, for the 16-QAM transmission, and
wherein the overhead is based at least in part on a value of a starting orthogonal frequency division multiplexing (OFDM) symbol index in the subframe.

28. An apparatus for wireless communication, comprising:
means for receiving control information identifying a set of parameters associated with a first narrowband downlink shared channel modulated with at least 16-quadrature amplitude modulation (16-QAM); and
means for determining a resource allocation configuration for the first narrowband downlink shared channel based at least in part on the control information and based at least in part on an overhead associated with resources available for a 16-QAM transmission,
wherein the resource allocation configuration indicates:
a quantity of one or more subframes in the first narrowband downlink shared channel, and a quantity of repetitions, of a subframe of the one or more subframes, for the 16-QAM transmission, and wherein the overhead is based at least in part on a value of a starting orthogonal frequency division multiplexing (OFDM) symbol index in the subframe.

* * * * *